United States Patent
Jakob et al.

(10) Patent No.: US 12,217,349 B2
(45) Date of Patent: Feb. 4, 2025

(54) DIFFERENTIABLE INVERSE RENDERING BASED ON RADIATIVE BACKPROPAGATION

(71) Applicant: ECOLE POLYTECHNIQUE FEDERALE DE LAUSANNE (EPFL), Lausanne (CH)

(72) Inventors: Wenzel Jakob, Lausanne (CH); Merlin Nimier-David, Préverenges (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 175 days.

(21) Appl. No.: 17/923,822

(22) PCT Filed: May 7, 2020

(86) PCT No.: PCT/IB2020/054321
§ 371 (c)(1),
(2) Date: Nov. 7, 2022

(87) PCT Pub. No.: WO2021/224661
PCT Pub. Date: Nov. 11, 2021

(65) Prior Publication Data
US 2023/0206538 A1      Jun. 29, 2023

(51) Int. Cl.
*G06T 15/00* (2011.01)
*G06T 7/00* (2017.01)
(Continued)

(52) U.S. Cl.
CPC .......... *G06T 15/005* (2013.01); *G06T 7/0002* (2013.01); *G06T 15/06* (2013.01);
(Continued)

(58) Field of Classification Search
None
See application file for complete search history.

(56) References Cited

U.S. PATENT DOCUMENTS

2009/0128552 A1* 5/2009 Fujiki ............... G06T 19/006
345/419
2019/0087985 A1* 3/2019 Li ..................... G06T 15/005
(Continued)

OTHER PUBLICATIONS

Eric Veach "Robust Monte Carlo methods for light transport simulation", Ph.D. dissertation, Stanford University; Dec. 1997.
(Continued)

*Primary Examiner* — Sultana M Zalalee
(74) *Attorney, Agent, or Firm* — Maschoff Brennan (57) ABSTRACT

A computer-implemented inverse rendering method comprising: computing an adjoint image by differentiating an objective function that evaluates the quality of a rendered image, image elements of the adjoint image encoding the sensitivity of spatially corresponding image elements of the rendered image with respect to the objective function; sampling the adjoint image at a respective sample position to determine a respective adjoint radiance value associated with the respective sample position; emitting the respective adjoint radiance value into a scene model characterised by scene parameters; determining an interaction location of a respective incident adjoint radiance value with a surface and/or volume of the scene model; determining a respective incident radiance value or an approximation thereof at the interaction location; and updating a scene parameter gradient.

23 Claims, 5 Drawing Sheets

(51) Int. Cl.
- *G06T 15/06* (2011.01)
- *G06T 15/50* (2011.01)
- *G06T 17/00* (2006.01)

(52) U.S. Cl.
CPC ............ *G06T 15/506* (2013.01); *G06T 17/00* (2013.01); *G06T 2207/20084* (2013.01); *G06T 2207/30168* (2013.01); *G06T 2210/21* (2013.01)

(56) References Cited

U.S. PATENT DOCUMENTS

| | | | | |
|---|---|---|---|---|
| 2019/0339380 | A1* | 11/2019 | Marks | G01S 13/887 |
| 2020/0202590 | A1* | 6/2020 | George | G06T 11/006 |
| 2022/0408013 | A1* | 12/2022 | Popovich | H04N 23/64 |

OTHER PUBLICATIONS

Zhang et al., 2019, "A Differential Theory of Radiative Transfer", ACM Trans. Graph. 38, 6 (Nov. 2019).

James T Kajiya "The rendering equation", In ACM Siggraph Computer Graphics, vol. 20, ACM; 1986.

Azinović et al., 2019, "Inverse Path Tracing for Joint Material and Lighting Estimation", In Proceedings of Computer Vision and Pattern Recognition (CVPR), IEEE.

James Arvo "Analytic methods for simulated light transport", Ph.D. Dissertation, Yale University; 1995.

Eric Veach et al. "Bidirectional estimators for light transport", In Photorealistic Rendering Techniques, Springer, 145-167; 1995.

Müller et al., 2017, "Practical Path Guiding for Efficient Light-Transport Simulation", Computer Graphics Forum 36, (Jun. 4, 2017).

Wenzel Jakob "Light Transport on Path-Space Manifolds", Ph.D. Dissertation, Cornell University; Aug. 2013.

Li et al. "Differentiable Monte Carlo Ray Tracing Through Edge Sampling", ACM Transactions on Graphics 37, 6, Article 222 (Nov. 2018).

Loubet et al. "Reparameterizing Discontinuous Integrands for Differentiable Rendering", ACM Transactions on Graphics 38, (Dec. 6, 2019).

Hascoet and Pascual "The Tapenade automatic differentiation tool: Principles, model, and specifications", in ACM Transactions on Mathematical Software, vol. 39, Issue 3, 2013.

Nimier-David et al. "Radiative back propagation", ACM Transactions on Graphics, ACM, NY, US, vol. 39, No. 4, Jul. 2020.

Chen et al. "Neural Ordinary Differential Equations", arxiv.org, Cornell University Library, Jun. 2018.

Antoine McNamara et al: "Fluid control using the adjoint method", ACM Transactions on Graphics, ACM, NY, US, vol. 23, No. 3, Aug. 1, 2004 (Aug. 1, 2004) pp. 449-456, XP058213698.

Merlin Nimier-David et al: "Mitsuba 2", ACM Transactions on Graphics, ACM, NY, US, vol. 38, No. 6, Nov. 8, 2019, pp. 1-17.

Niemeyer et al: "Differentiable Volumetric Rendering: Learning Implicit 3D Representations without 3D Supervision", arxiv.org, Cornell University Library, Dec. 2019.

Tzu-Mao Li: "Differentiable Visual Computing", arxiv.org, Cornell University Library, 201 Olin Library Cornell University Ithaca, NY 14853, Apr. 2019.

Baydin et al. "Automatic Differentiation in Machine Learning: a Survey", Journal of Machine Learning Research, vol. 18, Apr. 2018.

Pontryagin, L.S., Boltyanskii, V.G., et al., "The Mathematical Theory of Optimal Processes," Interscience Publishers John Wiley & Sons, Inc., Translated from the Russian by K.N., Trirogoff (1962).

\* cited by examiner

DIFFERENTIABLE INVERSE RENDERING BASED ON RADIATIVE BACKPROPAGATION

TECHNICAL FIELD

The present invention lies in the field of computer graphics and is concerned with renderings, which are synthetic photographs created using computer simulations. A rendering algorithm is a type of computer program that can produce such images: it takes a description of a three-dimensional (3D) model or world (e.g. the shape, positions, and materials of objects) and performs a detailed physical simulation of light to expose the image on a virtual camera. Over the years, these types of simulations have become increasingly sophisticated, and the end result is often indistinguishable from reality. As a consequence, renderings are now widely used in our society, e.g., in entertainment (visual effects) or industrial fabrication (digital twins). The present invention focuses on the reverse direction, which is known as inverse rendering: instead of producing an image of a 3D virtual world, the goal is to go the other way and reconstruct a 3D model from an input image. More specifically, the present invention relates to differentiable rendering techniques, which are increasingly relevant in systems that perform inverse rendering. The main distinction of differentiable rendering compared to "ordinary" rendering methods is the availability of derivatives relating inputs and outputs of the simulation.

BACKGROUND OF THE INVENTION

Let us consider the task of determining the material or shape of an object from a set of images. This is a surprisingly difficult problem, since the pixel values encode a complex superposition of indirect effects: for instance, a part of the object could appear brighter because a neighbouring object reflects light towards it, or it could appear darker because another object casts a shadow. To solve this task, it is therefore not enough to focus on the object of interest alone, but we need to understand its relationship to the surrounding environment as well.

In the context of rendering, this type of radiative coupling between objects has been a crucial ingredient in the quest for photorealism, and a great variety of physically based methods that simulate the underlying principles of light transport and scattering have been proposed in the past decades. These methods solve an integral equation describing the energy balance of light and tend to be computationally fairly expensive, for example hours of rendering time for a single image are not uncommon.

At a high level, a rendering algorithm can be interpreted as a function $f:X \rightarrow y$, whose input encodes the shape and materials of objects. Evaluating $y=f(x)$ yields a rendered image that accounts for effects such as shadowing, specular interreflection, or subsurface scattering. Such interactions obscure the individual properties of objects, hence an inverse $f^{-1}(y)$ to recover scene parameters x from an image y is normally not available. Inverse rendering is thus a vastly more difficult problem than "normal" rendering, and no direct method for solving this problem currently exists, where the term "direct solution" refers to an algorithm that it is guaranteed to provide the answer after a fixed amount of computation. One of the aspects that makes this problem particularly difficult is that one cannot just focus on a single object, since the surrounding environment affects the answer and must be considered as well. Indirect approaches to inverse rendering exist. However, these methods have major shortcomings as explained next in more detail.

Figure 1:
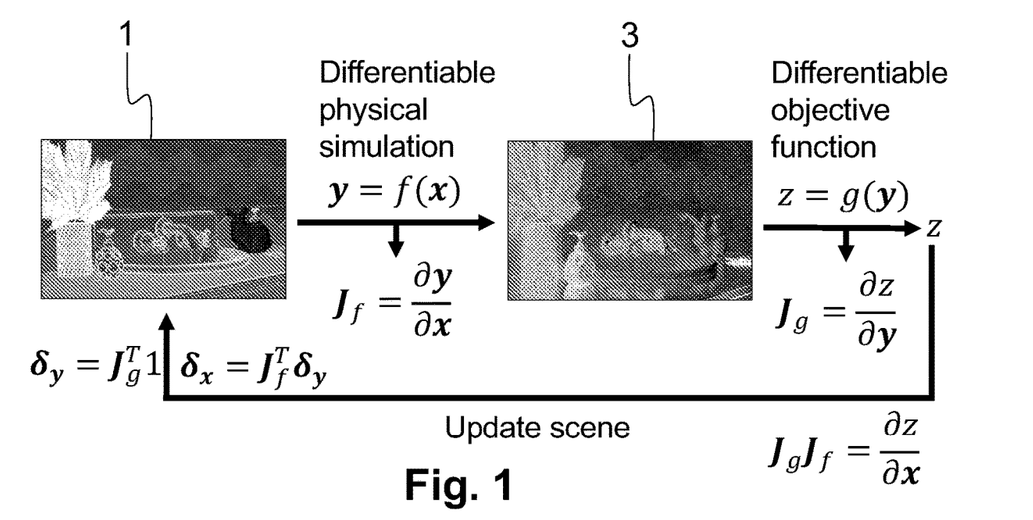
FIG. 1 a simplified flow chart illustrating an overview of the inverse rendering scenario.

To solve an inverse rendering problem, current solutions use an indirect approach that is known as differentiable rendering. To explain how it works, let us think of rendering as a function $f(x)$ which converts an input x (the scene description) into an output y (the rendering). Differentiable rendering then mathematically differentiates the function $f$ to obtain derivatives ∂x/∂y or ∂y/∂x. Differentiable rendering uses such derivatives in reverse to determine how a desired change in the output y (the rendering) can be achieved by changing the inputs x (the scene description). However, because derivatives only provide extremely local information about the behaviour of the function $f$, this does not immediately bring us to the right answer. Instead, the process must be split into smaller steps that produce a sequence of scene parameters $x_1$, $x_2$, $x_3$ that progressively improve the quality of the inversion, as measured by an objective function $z=g(y)$. The objective function would thus measure how well the current result agrees with an observation (e.g. a photograph taken by a real-world camera) or how close it comes to a specified design goal. FIG. 1 illustrate the involved steps. More specifically, FIG. 1 succinctly illustrates how a rendering operation is carried out on a scene or model 1 to obtain a rendered image 3. The scene description x is characterised by scene parameters, such as the shape and position of the objects, materials, light sources, camera pose, etc. Multiplication of computed derivatives ∂y/∂x and ∂z/∂y yields ∂z/∂x, which can then be used to update the scene parameters in order to adjust the output y, i.e. the rendered image 3.

Incidentally, all of the above is extremely similar to how neural networks are trained using techniques known as gradient descent and backpropagation. Their inputs (neural network parameters) are similarly adjusted using differentiation and small modifications using a sequence of steps in order to improve their performance with respect to a certain task, as measured by an objective function.

The main problem with current practice is that differentiating a light simulation is prohibitively costly, making it infeasible for most practical problems. The state-of-the art approach for differentiating such a simulation requires that all computations (i.e. every single addition, multiplication, etc.) that take place during the simulation are recorded into a transcript that is later analysed to determine the derivatives. This transcript unfortunately becomes extremely large, e.g. gigabytes of data per second of rendering time, while the computation time of realistic renderings is normally measured in hours. This rapidly exhausts the memory capacity of even the most powerful machines.

SUMMARY OF THE INVENTION

It is an object of the present invention to overcome at least some of the problems identified above related to differentiable rendering, and especially when used to solve inverse rendering problems. More specifically, one of the aims of the present invention is to provide an inverse rendering algorithm or method that no longer requires a transcript and is thus considerably more scalable and computationally efficient.

According to a first aspect of the invention, there is provided a computer-implemented inverse rendering method as recited in claim 1.

The main difference of the proposed solution compared with the current state of the art is that it uses a novel approach for differentiating a rendering algorithm that no longer requires a transcript. This means that it can be applied to essentially arbitrarily large and complex inversion problems without running out of memory within seconds. A less obvious consequence of this change is that reading and writing large amounts of memory also takes a large amount of time. The proposed method requires only a minimal amount of memory, and it is hence faster. The speedup depends on the specifics of the problem being solved and can be considerable, i.e., up to a speedup factor of about 1000 or even more.

According to a second aspect of the invention, there is provided a non-transitory computer program product comprising instructions for implementing the steps of the method according to the first aspect of the present invention when loaded and run on computing means of a computation or simulation apparatus.

According to a third aspect of the invention, there is provided an apparatus configured to carry out the method according to the first aspect.

Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF AN EMBODIMENT OF THE INVENTION

An embodiment of the present invention will now be described in detail with reference to the attached figures. Identical or corresponding functional and structural elements which appear in the different drawings are assigned the same reference numerals. It is to be noted that the use of words "first", "second" and "third", etc. may not imply any kind of particular order or hierarchy unless this is explicitly or implicitly made clear in the context. Vectors are denoted using a bold font. Furthermore, the following notations are used throughout the present description:

X: Space of scene parameters;
Y: Space of rendered images;
x: Scene parameters;
y: Rendered image;
$f$: Rendering algorithm;
$J_f$: Jacobian of the rendering algorithm;
g: Objective function;
$J_g$: Jacobian of the objective function;
$\delta_x$: Perturbation/gradient of scene parameters;
$\delta_y$: Perturbation/gradient of rendered image;
$I_1, \ldots, I_n$: Pixel intensities in the rendered image;
A: Set of scene surfaces;
$L_i$: Incident radiance;
$W_k$: Importance function of the pixel k;
$\Omega$: Unit sphere;
(A, B): Inner product (product integral) in ray space $A \times \Omega$;
p: 3D Position within the scene;
$\omega$: Direction vector;
r(p, $\omega$): Ray tracing function;
$L_e$: Emitted radiance;
$L_o$: Outgoing radiance;
$f_s$: Bidirectional scattering distribution function (BSDF);
$f_p$: Volume phase function;
$\partial_x$: Derivative with respect to all scene parameters;
Q(p, $\omega$): Effective emission of differential radiance;
K: Scattering operator;
$\overline{K}$: Volume scattering operator;
G: Propagation operator;
$\overline{G}$: Volume propagation operator;
S: Solution operator;
$\overline{S}$: Volume solution operator;
$A_e$: Emitted adjoint radiance;
$A_i$: Incident adjoint radiance;
$A_o$: Outgoing adjoint radiance;
$Q_{approx}$(p, $\omega$): Approximate effective emission of differential radiance;
$\sigma_s$: Volume scattering coefficient;
$\sigma_t$: Volume extinction coefficient;
T($p_1$, $p_2$): Volume transmittance between two points;
$\overline{Q}_1$: Operator modelling differential emission due to scattering;
$\overline{Q}_2$: Operator modeling differential emission due to transport;
$\overline{Q}$(p, $\omega$): Effective emission of differential radiance (additionally accounting for volumes).

The present invention is concerned with differentiable rendering techniques, which are increasingly relevant in systems that perform inverse rendering. As mentioned earlier, the main distinction of differentiable rendering compared to "ordinary" rendering methods is the availability of derivatives $\partial y/\partial x$ relating inputs and outputs of the simulation. Combined with a first-order optimisation algorithm, a differentiable renderer is then able to navigate the parameter space to find solutions to different types of inverse problems. However, this is not a panacea: optimisation objectives can be highly non-convex, requiring significant attention to initial guesses and regularisation to obtain satisfactory results. The present invention focuses primarily on the mechanics of differentiation in the context of rendering rather than general optimisation-related challenges.

The scene parameters x being optimised could include but are not limited to pixelised or voxelised representations of the scene. The scene parameters also comprise one or more of the following items: object shape, object position, object material, light source parameter(s), camera pose, and surface parameter(s) (e.g. surface roughness or reflectivity) just to name a few possible scene parameters.

It is to be noted that the spaces X and Y are generally high-dimensional ($10^5$-$10^8$D), hence direct evaluation of the Jacobian $J_f := \partial f(x)/\partial x$ is infeasible. Instead, all previously proposed rendering techniques compute simpler matrix-vector products that fall into one of two categories: forward-mode methods evaluate $\delta_y = J_f \delta_x$ to determine how an infinitesimal perturbation $\delta_2$ of the scene parameters changes the output image. In contrast, reverse-mode approaches use a transpose product $\delta_x = J_f^T \delta_y$ to determine how the scene parameters should be updated (to first order) to realise a desired change $\delta_y$ to the output image. While most differentiable rendering techniques proposed so far are in the former category, the latter approach is preferable for solving inverse problems, especially when the parameter X space has more than a few dimensions. The reason for this is that reverse-mode approaches compute all derivatives at once in a single pass, while forward-mode approaches require a separate differentiation pass for every desired derivative (which is prohibitive when the space of scene parameters has millions of dimensions).

However, one major downside of the traditional reverse-mode approaches is that they require a detailed transcript of intermediate computation steps to back-propagate derivatives to the scene parameters. For an hour-long rendering, this data structure would be staggeringly large, exceeding the available system memory by many orders of magnitude. Simple scenes rendered at low quality can fit, though transcript-related memory traffic remains a severe performance bottleneck even in such cases.

The present invention introduces radiative backpropagation, which is a new technique for differentiable rendering that addresses the problems identified above of the existing solutions. Despite operating in reverse mode, the proposed method does not require a transcript of intermediate steps, allowing it to scale to complex and long-running simulations. Our key observation is that backpropagating derivatives through a rendering algorithm can be re-cast as the solution of a modified light simulation involving the partial derivative of radiance with respect to the optimisation objective, which is related to the so-called adjoint image as explained later. Importantly, this new problem can be solved separately from the original rendering problem, i.e., without retaining intermediate state.

Figure 2:
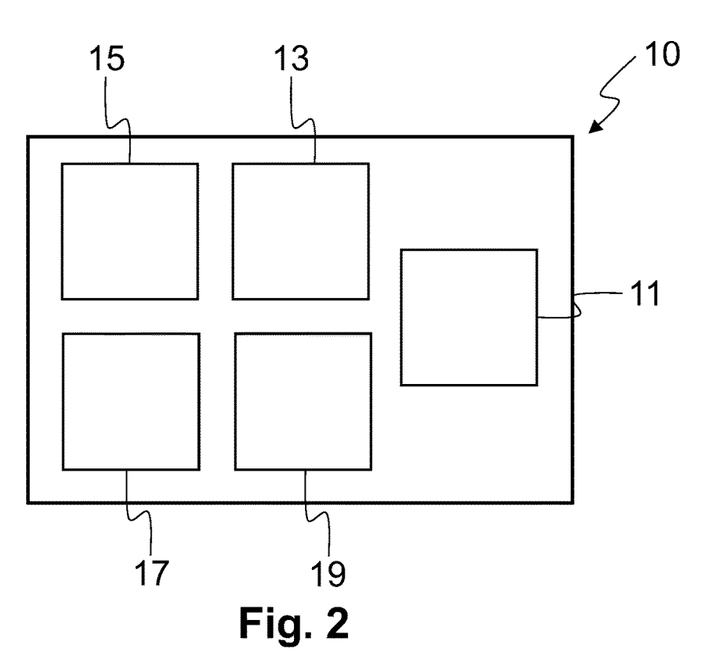
FIG. 2 is a block diagram showing schematically some functional elements of an apparatus that may be used carry out the inverse rendering method of the present invention.

The block diagram of FIG. 2 schematically illustrates some functional elements or blocks of the proposed apparatus or device 10 that are useful for understanding the teachings of the present invention. The apparatus may be a portable device, and it may for instance be integrated into a smart phone or another portable processing device. Alternatively, the apparatus may be a non-portable data processing device. The apparatus in this example comprises a communication interface 11 comprising communication means, such as a wireless receiver and/or transmitter, for communicating with other devices. A central processing unit 13 is provided to execute instructions that make up a computer program. A data storage unit or memory 15 is also provided for permanently or temporarily storing data. An image rendering unit or element 17 comprising a rendering and inverse rendering algorithm is provided to carry out all or most of the inverse rendering method steps as later explained in more detail. It is to be noted that the inverse rendering method could instead be executed by the central processing unit. In other words, a computer program running on the central processing unit may implement most or all of the proposed inverse rendering method steps. A display 19 is configured to show the results to a user. The apparatus may optionally also comprise a camera for capturing one or more images.

Before delving into the specifics of the proposed method, the relevant radiative transfer equations and their differential formulations are briefly reviewed. The former roughly follows the notations of Eric Veach, 1997, "Robust Monte Carlo methods for light transport simulation", Ph.D. dissertation, Stanford University, and the latter is a subset of the framework proposed by Cheng Zhang et al., 2019, "A Differential Theory of Radiative Transfer", ACM Trans. Graph. 38, 6 (2019), which is included here for completeness. To keep the discussion simple, it is initially focused on a simplified problem without volumetric effects, and furthermore, derivatives that arise due to parameter-dependent silhouette boundaries are ignored. The ideas underlying radiative backpropagation are orthogonal to these aspects, and we refer the reader to Zhang et al. for a full definition of the differential quantities with all terms. The volumetric analogue of radiative backpropagation is explained later in more detail.

Rendering algorithms estimate sets of measurements $I_1, \ldots, I_n$ corresponding to image or picture elements, referred to as pixels, in an image or picture. These measurements are defined as inner products in ray space $A \times \Omega$ involving the incident radiance $L_i$ and the importance function $W_k$ of pixels $k = 1, \ldots, n$:

$$I_k = \langle W_k, L_i \rangle \qquad \text{(Measurement)}$$
$$= \int_A \int_\Omega W_k(p, \omega) L_i(p, \omega) |\cos\theta| d\omega \, dp.$$

In this document, cosine factors like the $|\cos\theta|$ above account for foreshortening (i.e. the property that light arriving at a glancing angle stretches out over a larger surface area). The quantity $\theta$ denotes the angle between $\omega$ and the surface normal at p. Radiance is invariant along unoccluded rays, relating $L_i$ to the outgoing radiance at the nearest surface $r(p, \omega)$ visible along the ray $(p, \omega)$:

$$L_i(p,\omega) = L_o(r(p,\omega), -\omega). \qquad \text{(Transport)}$$

At surfaces, radiance satisfies an energy balance condition relating sources and sinks, specifically emission $L_e(p, \omega)$, and absorption or reflection of incident illumination modelled via $f_s(p, \omega, \omega')$, the bidirectional scattering distribution function (BSDF) of the surface at p:

$$L_o(p,\omega) = L_e(p,\omega) + \int_\Omega L_i(p,\omega') f_s(p,\omega,\omega') |\cos\theta| d\omega'. \qquad \text{(Scattering)}$$

Monte Carlo rendering techniques, such as path tracing according to James T Kajiya, 1986, "The rendering equation", In ACM Siggraph Computer Graphics, Vol. 20, ACM, recursively sample the above equations using sophisticated importance sampling strategies to obtain unbiased estimates of the measurements $I_1, \ldots, I_n$.

Differential Radiative Transfer

We now turn to differential radiative transfer by differentiating the left and right hand sides of the preceding three equations with respect to all scene parameters $x = (x_1, \ldots, x_m)$, resulting in vectoral equations. For notational convenience, we define a partial derivative $\partial_x := \partial/\partial_{(x_1, \ldots, x_m)}$ with respect to all parameters and assume component-wise multiplication of the resulting vector quantities. The resulting equations will relate differential incident, outgoing, and emitted radiance $\partial_x L_i$, $\partial_x L_o$ and $\partial_x L_e$ to each other. Differential radiance in many ways resembles "ordinary" radiance, and we will simply think of it as another type of radiation that can be transported and scattered.

To start, a differential measurement of pixel k involves a ray space inner product involving differential incident radiance $\partial_x L_i$ and importance $W_k$:

$$\partial_x I_k = \int_A \int_\Omega W_k(p,\omega) \partial_x L_i(p,\omega) |\cos\theta| d\omega dp. \qquad \text{(Diff. Measurement)}$$

Here, we have assumed a static sensor, hence $\partial_x W_k = 0$. Differentiating the transport equation yields no surprises: differential radiance is transported in the same manner as normal radiance:

$$\partial_x L_i(p,\omega) = \partial_x L_o(r(p,\omega),-\omega). \quad \text{(Diff. Transport)}$$

The derivative of the scattering equation is more interesting:

$$\partial_x L_o(p,\omega) = \partial_x L_e(p,\omega) + \int_\Omega [\partial_x L_i(p,\omega') f_s(p,\omega,\omega') + L_i(p,\omega') \partial_x f_s(p,\omega,\omega')] \cdot |\cos\theta| d\omega', \quad \text{(Diff. Scattering)}$$

where $\partial_x L_e(p,\omega)$ is referred to as Term 1, $\partial_x L_i(p,\omega') f_s(p,\omega,\omega')$ is referred to as Term 2, and $L_i(p,\omega') \partial_x f_s(p,\omega,\omega')$ is referred to as Term 3. The above can be interpreted as another kind of energy balance equation. In particular, Term 1. Differential radiance is "emitted" by light sources whose brightness changes when perturbing the scene parameters x.

Term 2. Differential radiance "scatters" in the same way as normal radiance, i.e., according to the BSDF of the underlying surface.

Term 3. Differential radiance is additionally "emitted" when the material at p changes as a function of the scene parameters.

In the following, tools are developed to sample these equations in reverse mode.

Optimisation Using Differential Transport

Applications of differentiable rendering to optimisation problems (e.g. inverse rendering) require an objective function g: Y→R that measures the quality of tentative solutions. This objective could be a simple pixel-wise $L_1$ or $L_2$ error or a function with a more complex dependence, such as a Wassertein metric or a convolutional neural network. Given g, we seek to minimise the concatenation $g(f(x))$ using an iterative gradient-based optimisation technique, bearing in mind that evaluations are necessarily noisy due to the underlying Monte Carlo integration.

It is tempting to perform differentiable rendering by simply evaluating the composition $g(f(x))$ and recording a transcript, followed by reverse-mode propagation. The first issue with this approach was noted by Azinović et al., 2019, "Inverse Path Tracing for Joint Material and Lighting Estimation", In Proceedings of Computer Vision and Pattern Recognition (CVPR), IEEE, and can be observed after rewriting the gradient as a product of the Jacobians via the chain rule:

$$\partial_x g(f(x)) = J_{g \circ f}(x) = J_g(f(x)) J_f(x).$$

In practice, both factors above are numerically estimated using sets of Monte Carlo samples. Since this occurs simultaneously using the same samples, the resulting random variables are correlated, meaning that the identity $E[XY] = E[X]E[Y]$ no longer holds, and the resulting gradients are thus biased. The second problem is that the transcript of $g \circ f$ is even longer than the already problematic rendering step, especially when the objective function is nontrivial. In contrast, the proposed approach splits differentiation into three steps: rendering, differentiation of the objective, and radiative backpropagation. In pseudocode:

define gradient(x):
  #1. Ordinary rendering (no differentiation), step 101 in FIG. 4a.
  $y = f(x)$
  #2. Differentiate objective at y (manually or by using automatic differentiation), step 107 in FIG. 4a.
  #3. Estimate $\delta_x = J_f^T \delta_y$ using radiative backpropagation.
  return radiative_backpropagation(x, $\delta_y$)

The function radiative_backpropagation with inputs x and $\delta_y$ is explained in Listing 1 further below. The parameter gradient $\delta_x$ is here understood to be an array, a set or vector of scene parameter derivatives. We refer to $\delta_y \in R^n$ as the adjoint rendering or adjoint image. It encodes the sensitivity of pixels of the rendered image with respect to the objective, i.e., how the rendered image should change to optimally improve the objective locally. Unless noted otherwise, the qualifier "adjoint" is used in the automatic differentiation sense throughout the present description, i.e., indicating sensitivity with regards to an optimisation objective. The algorithm's main steps are illustrated in FIG. 3.

Figure 3:
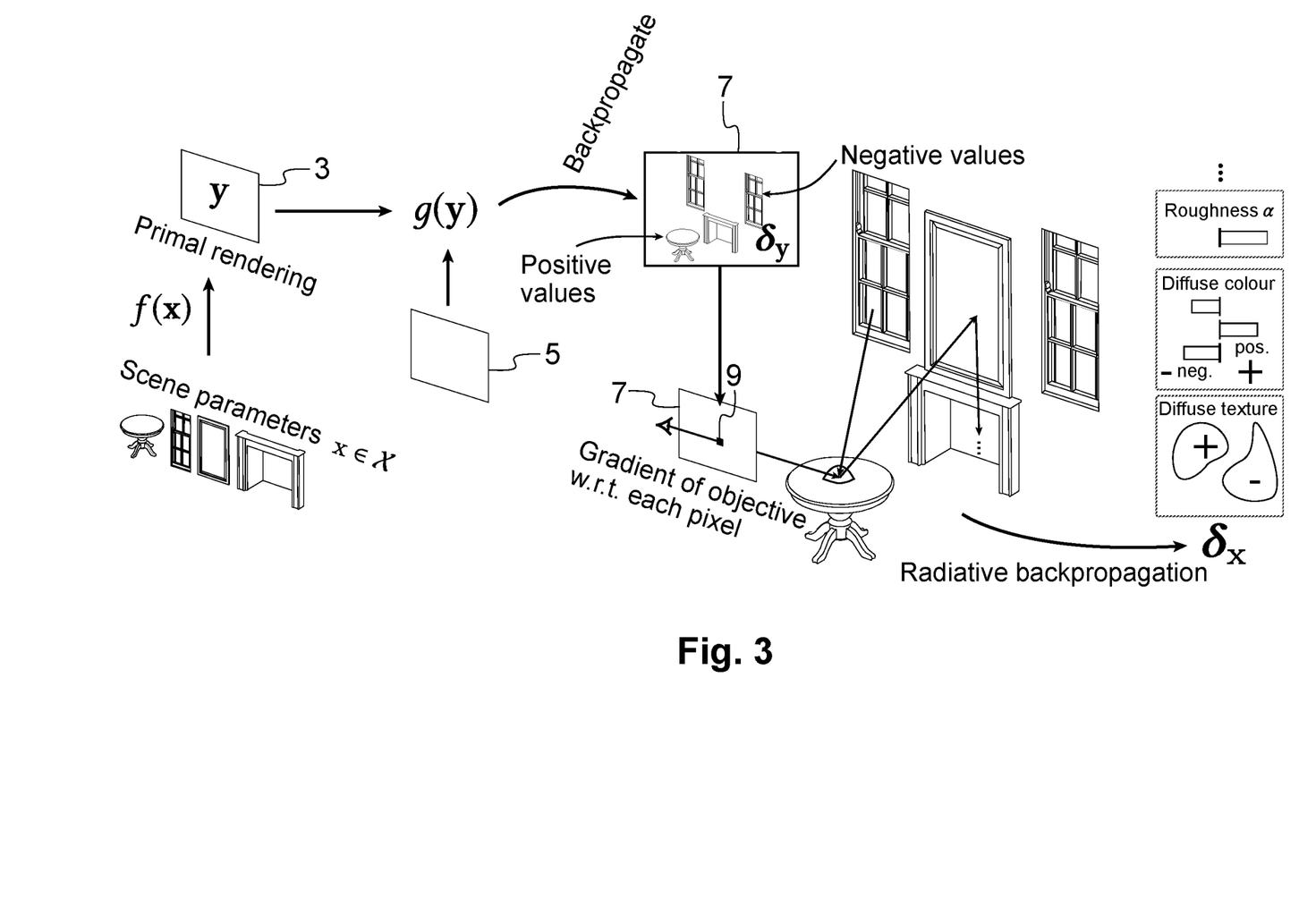
FIG. 3 is a simplified flow chart showing an overview of the inverse rendering method according to an example embodiment of the present invention.

As shown in FIG. 3, the process computes gradients of an arbitrary objective function $g(f(x))$ with respect to the scene parameters x. At each iteration, the process performs a fast primal (i.e. non-differentiable) rendering step producing an image $y = f(x)$. The rendered image 3(y) and a target or reference image 5 are then fed into an objective function, which compares the inputs, and outputs g(y) indicating how close the two input images are. The second step differentiates the objective function by backpropagating g(y) to compute an adjoint rendering or an adjoint image 7 ($\delta_y$) that expresses the sensitivity of individual image pixels with respect to the optimisation task. Radiative backpropagation is the final step and main contribution of the present invention. It consists of a computer-implemented simulation, in which adjoint radiance of the adjoint image $\delta_y$ is emitted by the sensor, scattered by the scene, and eventually received by objects with differentiable parameters. Its output are parameter gradients $\delta_x$.

Adjoint Radiance

We now turn to the stochastic evaluation of the parameter gradient $\delta_x = J_f^T \delta_y$. The columns of the Jacobian are the parametric derivatives of pixel measurements, i.e.

$$J_f = [\partial_x I_0, \ldots, \partial_x I_n].$$

Substituting the Differential Measurement Equation into the Above Expression Yields $$J_f^T \delta_y = \sum_{k=1}^n \delta_{y,k} \partial_x I_k,$$

and this expands to $$\int_A \int_{S^2} A_e(p,\omega) \partial_x L_i(p,\omega) |\cos\theta| d\omega \, dp,$$

where we have defined the emitted adjoint radiance $A_e(p,\omega) = \sum_{k=1}^n \delta_{y,k} W_k(p,\omega)$, and $\delta_{y,k}$ refers to pixel k of $\delta_y$. With this substitution, the desired gradient $J_f^T \delta_y$ turns into an inner product in ray space:

$$= \langle A_e, \partial_x L_i \rangle.$$

We think of $A_e$ as an emitted quantity. For instance, in the case of a pinhole camera, it can be interpreted as a textured "spot light" that projects the adjoint rendering into the scene. A primal renderer, i.e., an ordinary renderer, typically estimates an inner product of emitted importance and incident radiance. In contrast, radiative backpropagation replaces these with differential quantities: emitted adjoint radiance, and the incident differential radiance (incident on objects' surface).

Operator Formulation

The previous expression is reminiscent of the starting point of the operator formulation developed by James Arvo, 1995, "Analytic methods for simulated light transport", Ph.D. Dissertation, Yale University, and Eric Veach, 1997, "Robust Monte Carlo methods for light transport simulation", Ph.D. Dissertation, Stanford University. A similar approach is followed here, and we begin by defining an effective emission term Q(p, ω) that includes terms 1 and 3 of the differential scattering equation. It is to be noted that the latter is nonzero when the scattered radiance at p changes as a function of the material parameters.

$$Q(p,\omega) \partial_x L_e(p,\omega) + \int_\Omega \Box L_i(p,\omega') \partial_x f_s(p,\omega,\omega') |\cos \theta| d\omega'.$$

We then define a scattering operator K, and a propagation operator G:

$$(Kh)(p,\omega) := \int_\Omega \Box h(p,\omega') f_s(p,\omega,\omega') |\cos \theta| d\omega', (Gh)(p,\omega)$$
$$h(r(p,\omega),-\omega),$$

reducing the differential transport and scattering equations to $$\partial_x L_i = g \partial_x L_o, \text{ and } \partial_x L_o = Q + K \partial_x L_i.$$

Differential radiance scatters and propagates like "ordinary" radiance, hence K and G are identical to Veach's operators, allowing us to immediately state the solution of outgoing differential radiance:

$$\partial_x L_o = Q + K G \partial_x L_o = (1-KG)^{-1} Q = \Sigma_{i=0}^\infty (KG)^i Q, \text{ where}$$
$$(I-KG)^{-1} =: S$$

via the solution operator S given in terms of a Neumann series expansion of 3C and G. Veach also showed that G, K and GS are self-adjoint (in the sense of functional analysis) linear operators when the scene satisfies elementary physical constraints, in particular, when all BSDFs are energy-conserving and reciprocal. Self-adjoint operators O have the property that $(O_{v_1},v_2)=(v_1 O v_2)$, meaning that $$J^T \delta_y = (A_e, \partial_x L_i) = (A_e, GSQ) = (GSA_e, Q).$$

This equation encapsulates the key idea of radiative backpropagation. It states that instead of scattering and propagating differential radiance (as implied by the expression $(A_e, GSQ)$), we can also start "from the other side" and scatter and propagate adjoint radiance instead (as implied by the expression $(GSA_e, Q)$). This is a vastly easier problem: $A_e$ is scalar-valued, while Q is a vectorial function whose dimension matches that of the parameter space X (i.e. potentially millions).

Sampling Strategies for Differential Rendering

To complete the symmetry, we can finally define analogous incident and outgoing variants of adjoint radiance satisfying $$A_i = GA_o, \text{ and } A_o = A_e + KA_i.$$

We present in the following a simple path tracing-style integrator that samples adjoint incident radiance $A_i$ at surface locations to compute its inner product $(A_i, Q)$ with the effective differential emission. At specific surface positions, the Q term is extremely sparse, admitting a highly efficient integration procedure.

A great variety of alternative sampling schemes are conceivable: for instance, certain scene parameters may have a significant effect on the scene's local radiance distribution (corresponding to very large component values in the effective emission term Q). Scene locations affected by this could be sampled in a more targeted fashion to create an additional connection strategy akin to next event estimation in the context of path tracing.

The benefits of such a connection strategy will be marginal if most of the generated samples cannot be connected to the adjoint subpath sampled from the camera end (e.g. due to occlusion). Analogous to bidirectional path tracing (Eric Veach and Leonidas Guibas, 1995, "Bidirectional estimators for light transport", In Photorealistic Rendering Techniques, Springer, 145-167), it may be helpful to scatter and transport these samples multiple times through the scene to increase the probability of a successful connection, creating a family of bidirectional connection strategies.

One of the main contributions of the present invention is that it casts the problem of reverse-mode differentiable rendering into familiar light transport terms, enabling the application of a large toolbox of algorithms and sampling strategies developed in the last decades.

Further Considerations

Dependence on primal radiance. One potential stumbling block is that the effective emission term Q contains the primal incident radiance $L_i$. In the present implementation, sampling Q therefore involves a recursive invocation of a classical path tracer. Path tracing, which is part of traditional rendering approaches in the field of computer graphics, can be understood as a Monte Carlo method for rendering images of three-dimensional scenes such that the physical behaviour of light (including inter-reflection) is faithfully reproduced. The algorithm integrates over all the illuminance arriving at a single point on the surface of an object. This illuminance can then be reduced by a surface reflectance function to determine how much of it will go towards the viewpoint camera or another scene location. The integration step is repeated for every pixel in the output image and may trigger recursive integration steps to capture the effect of inter-reflection between objects. Path tracing naturally simulates many effects that have to be specifically added to other methods (conventional ray tracing or scanline rendering), such as, depth of field, motion blur, caustics, ambient occlusion, soft shadows, and indirect lighting. Path tracing can also be understood as a repeated application of ray tracing.

We perform the recursive estimate at every interaction with differentiable parameters, which can be costly (quadratic complexity) when sampling long light paths with many interactions. The same issue was also reported by Zhang et al., 2019, "A Differential Theory of Radiative Transfer", ACM Trans. Graph. 38, 6 (2019), in the context of forward-mode differentiation. Interactions with objects whose properties are not being differentiated do not trigger any additional computation compared to a standard path tracer.

When the scene involves very long light paths and many differentiable objects, it might therefore be preferable to precompute a data structure that enables cheap approximate queries of $L_i$. For example, a path guiding technique, for instance according to Müller et al., 2017, "Practical Path Guiding for Efficient Light-Transport Simulation", Computer Graphics Forum 36, 4 (June 2017), could be used to accelerate rendering in the primal phase. The resulting spatio-directional tree storing an interpolant of $L_i$ could subsequently be used to perform radiance queries in the adjoint phase.

Volumetric scattering. Radiative backpropagation also supports participating media. The theoretical derivation is next explained in more detail. The volumetric case is analysed with reference to the following operator formulation from Wenzel Jakob, 2013, "Light Transport On Path-Space Manifolds", Ph.D. Dissertation, Cornell University. Its generalised scattering operator is given by $$(\overline{\mathcal{K}}h)(p,\omega) := \begin{cases} \int_\Omega^{[]} h(p,\omega')f_s(p,\omega,\omega')|\cos\theta|d\omega', & p \in \mathcal{A} \\ \sigma_s(p)\int_\Omega^{[]} h(p,\omega')f_p(p,-\omega,\omega')d\omega', & p \notin \mathcal{A} \end{cases}$$

Which turns incident radiance into either outgoing radiance on surfaces, and into outgoing radiance per unit length volumes. Here $\sigma_s$ is the medium's scattering coefficient and $f_p$ is the phase function. The propagation operator reads $$(\overline{G}h)(p,\omega)) := \int_p^{r(p,\omega)} T(p,p')h(p',-\omega)dp' + T(p,r(p,\omega))h(r(p,\omega)),-\omega),$$

and returns incident radiance due to both outgoing surface radiance and outgoing radiance per unit length in volumes. The integral notation above specifies a unit-speed line integral between endpoints p and r(p, ω). The function T is the volumetric transmittance defined as $$T(a,b) = e^{-\int_a^b \sigma_t(p_t)1p},$$

and references the extinction coefficient $\sigma_t$. Using the above definitions, the generalised equilibrium equation reads $$L_i = \overline{G}(\overline{\mathcal{K}}L_i + L_e).$$

Differentiating the operators with respect to scene parameters via the product rule yields the following sum of terms:

$$\partial_x(\overline{\mathcal{K}}h)(p,\omega) = \begin{cases} \int_\Omega^{[]} [\partial_x h(p,\omega')f_s(p,\omega,\omega') + h(p,\omega')\partial_x f_s(p,\omega,\omega')]|\cos\theta|d\omega', & p \in \mathcal{A} \\ \int_\Omega^{[]} [\partial_x h(p,\omega')\sigma_s(p,-\omega,\omega') + h(p,\omega')\partial_x \sigma_s(p)f_p(p,-\omega,\omega') + h(p,\omega')\sigma_s(p)\partial_x f_p(p,-\omega,\omega')]d\omega', & p \notin \mathcal{A} \end{cases}$$

and the derivative of the propagation operator is given by $$\partial_x(\overline{G}h)(p,\omega) = \int_p^{r(p,\omega)}[\partial_x T(p,p')h(p',-\omega)+T(p,p')\partial_x h(p',-\omega)]dp' + \partial_x T(p,r(p,\omega))h(r(p,\omega),-\omega)+T(p,r(p,\omega))\partial_x h(r(p,\omega),-\omega).$$

We observe that both equations contain certain terms with the factor $\partial_x h$, and that the removal of all other terms would yield expressions that the match ordinary scattering and propagation operators applied to the function $\partial_x h$. These other terms only depend on primal quantities (in particular, h) and derivatives of material properties (e.g. $\partial_x \sigma_s(p)$), and the differential form of the operators can thus be cast into the form $$\partial_x \overline{\mathcal{K}}h = \overline{\mathcal{K}}\partial_x h + \overline{Q}_1 h \quad \partial_x \overline{G}h = \overline{G}\partial_x h + \overline{Q}_2 h$$

where the operators $\overline{Q}_1$ and $\overline{Q}_2$ model differential radiance that is emitted because optical properties depend on scene parameters x. More specifically, $\overline{Q}_1$ describes differential emission due to perturbations in BSDFs, phase functions, and the scattering coefficient, and $\overline{Q}_2$ contains differential emission due to perturbations in transmission along ray segments:

$$(\overline{Q}_1 h)(p,\omega) = \begin{cases} \int_\Omega^{[]} h(p,\omega')\partial_x f_s(p,\omega,\omega')|\cos\theta|d\omega', & p \in \mathcal{A} \\ \int_\Omega^{[]} [h(p,\omega')\partial_x \sigma_s(p)f_p(p,-\omega,\omega') + h(p,\omega')\sigma_s(p)\partial_x f_p(p,-\omega,\omega')]d\omega', & p \notin \mathcal{A} \end{cases}$$

$$(\overline{Q}_2 h)(p,\omega) = \int_p^{r(p,\omega)} \partial_x T(p,p')h(p',-\omega)dp' + \partial_x T(p,r(p,\omega))h(r(p,\omega),-\omega).$$

Both terms can be efficiently sampled using standard volumetric path tracing techniques. We can now derive the differential equilibrium equation:

$$\begin{aligned}
\partial_x L_i &= \partial_x \overline{G}(\overline{\mathcal{K}}L_i + L_e) \\
&= \overline{G}\partial_x(\overline{\mathcal{K}}L_i + L_e) + \overline{Q}_2(\overline{\mathcal{K}}L_i + L_e) \\
&= \overline{G}(\overline{\mathcal{K}}\partial_x L_i + \partial_x L_e + \overline{Q}_1 L_i) + \overline{Q}_2(\overline{\mathcal{K}}L_i + L_e) \\
&= \overline{G}\overline{\mathcal{K}}\partial_x L_i + \overline{G}\partial_x L_e + \overline{G}\overline{Q}_1 L_i + \overline{Q}_2(\overline{\mathcal{K}}L_i + L_e) \\
&= (I - \overline{G}\overline{\mathcal{K}})^{-1}\overline{Q}
\end{aligned}$$

where $\overline{Q} := \overline{G}\partial_x L_e + \overline{G}\overline{Q}_1 L_i + \overline{Q}_2(\overline{\mathcal{K}}L_i + L_e)$, which is an effective emission term that accounts for all sources of emitted differential radiance, and $\overline{S} = (I - \overline{G}\overline{\mathcal{K}})^{-1}$ which is the generalised solution operator. As before, differential radiative transfer can thus be understood as the solution of an ordinary transport problem with a modified emission term. The volumetric form of radiative backpropagation then exploits the self-adjoint nature of $\overline{S}$ to efficiently compute the following inner product:

$$J^T \delta_y = (A_e, \partial_x L_i) = (A_e, \overline{S}\overline{Q}) = (\overline{S}A_e, \overline{Q}).$$

Visibility. Although the actual implementation of radiative backpropagation does not necessarily compute visibility-related gradients, they could be integrated into the proposed framework. Two very different high-level approaches for differentiating discontinuous light transport integrals have been studied in prior work: Li et al., 2018, "Differentiable Monte Carlo Ray Tracing Through Edge Sampling", ACM Transactions on Graphics 37, 6, Article 222 (December 2018), propose a new sampling strategy for silhouette edges that accounts for their effect on derivatives. This strategy could in principle also be used during radiative backpropagation by sampling a position on a silhouette edge at every iteration of the radiative backpropagation algorithm and propagating some of the adjoint radiance towards the geometric variables associated with that edge. Loubet et al., 2019, "Reparameterizing Discontinuous Integrands for Differentiable Rendering", ACM Transactions on Graphics 38, 6 (December 2019), observed that the problem of incorrect gradients can also be addressed by performing a change of variables in all light transport integrals. In particular, the new coordinates must be carefully chosen so that the discontinuities remain static when perturbing the scene parameters x. Naturally, the re-parameterisation must itself depend on x to achieve this. Loubet et al. also propose a simple ray-tracing based query to estimate suitable re-parameterisations with controllable bias. Such a change of variables could be performed during radiative backpropagation, which requires no modifications to the previous derivations.

Radiative Backpropagation Path Tracing

Listings 1 and 2 shown below provide the pseudocode of a simple path tracing-style variant of radiative backpropagation. It is to be noted that all scene elements (BSDFs, emitters) in these listing are assumed to have an implicit dependence on the scene parameters x. For simplicity, we omit a number of optimisations that are standard in path tracers, and which are similarly straightforward to implement in the proposed method, in particular: Russian roulette, direct illumination sampling strategies for emitters, and multiple importance sampling to combine BSDF and emitter sampling strategies. One interesting optimisation opportunity that we currently do not exploit is that many pixels may be associated with a relatively small amount of adjoint radiance (i.e. $A_e(p, \omega) \approx 0$), in which case rays $(p, \omega)$ should be sampled directly from $A_e$ instead of the sensor's importance function.

Figure 4A:
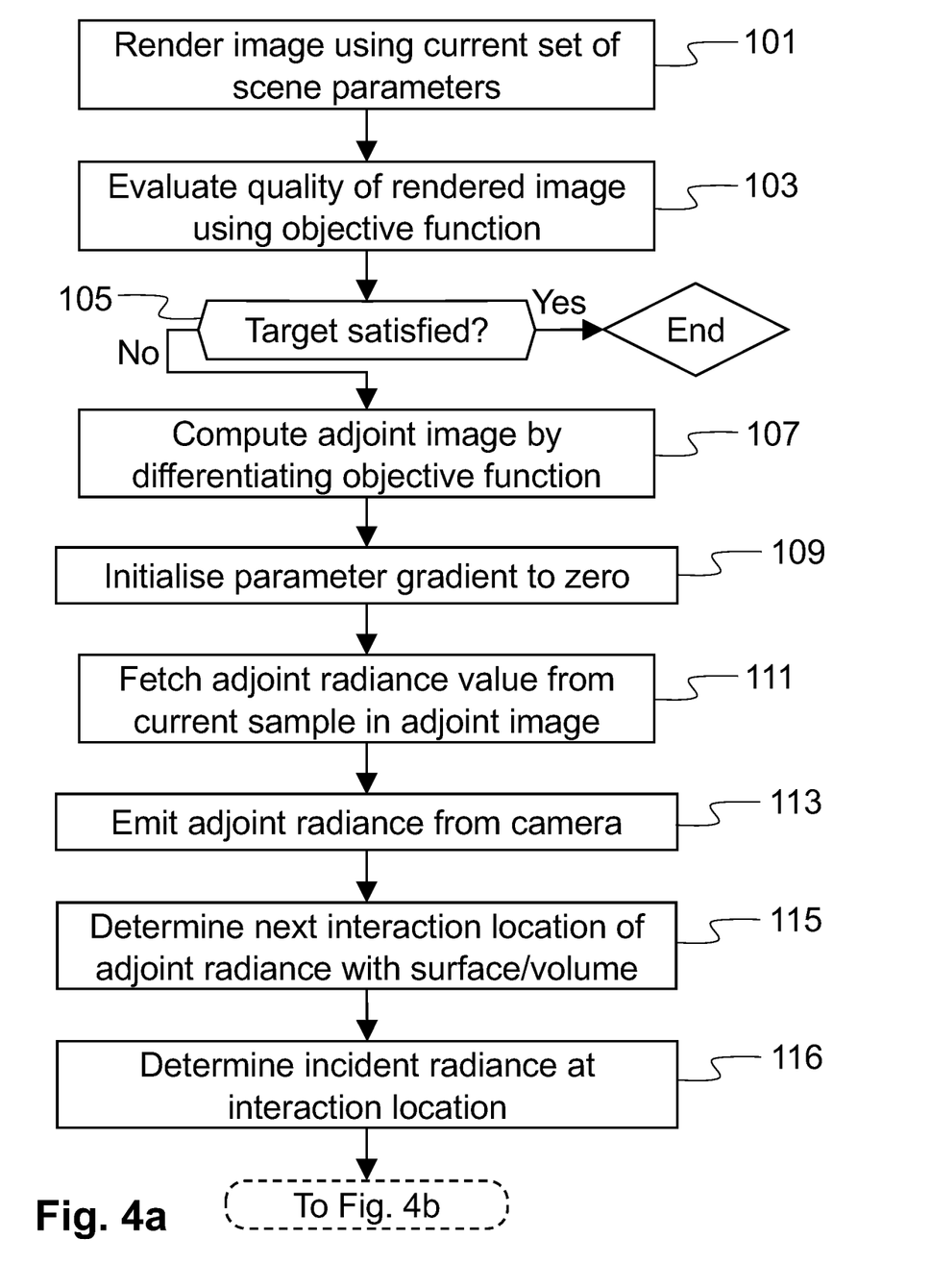
FIGS. 4a and 4b show a flow chart illustrating in more detail the teachings of the proposed inverse image rendering method according to an example embodiment of the present invention.

Two lines of the form invoking the shader q(z), and shown in Listing 2 below, and where δ denotes the adjoint radiance:

grad+=adjoint([[q(z)]],δ)

deserve further explanation. This syntax indicates an evaluation of the adjoint of q: we wish to propagate the gradient δ from the outputs of the function q evaluated at (x, z) to its differentiable parameters x∈X by evaluating $J_q^T(x, z)$ δ. The function "adjoint" then returns the derivative with respect to the scene parameters, i.e. a vector whose dimension size matches that of the set X. It is to be noted that adjoints of typical components of rendering systems yield extremely sparse gradient vectors: for instance, evaluations a textured BSDF will only depend on a few parameters that correspond to nearby texels. Adding million-dimensional vectors with only a few nonzero entries at every interaction would be very wasteful, hence it is beneficial that adjoint( ) exploits the underlying sparsity pattern. We note that the adjoint function "adjoint([[q(z)]], δ)" of a shader q(z) can be implemented manually, or generated automatically using standard differentiation tools based on program transformation. A well-known example of such a tool is given by Hascoet and Pascual "The Tapenade automatic differentiation tool: Principles, model, and specifications", in ACM Transactions on Mathematical Software, Vol. 39, Issue 3, 2013. The proposed implementation of radiative backpropagation building on this operation is explained-below in more detail. It is to be noted that this entails the application of standard Monte Carlo sampling techniques. As is common with this approach, one must keep track of sampling weights that arise due to importance sampling and path termination strategies. The "weight" variable that occurs below is such a sampling weight.

define radiative_backprop(x, δ_y):
  # Initialise parameter gradient(s) to zero, step 109 in FIG. 4a.

δ_x=0

Figure 4B:
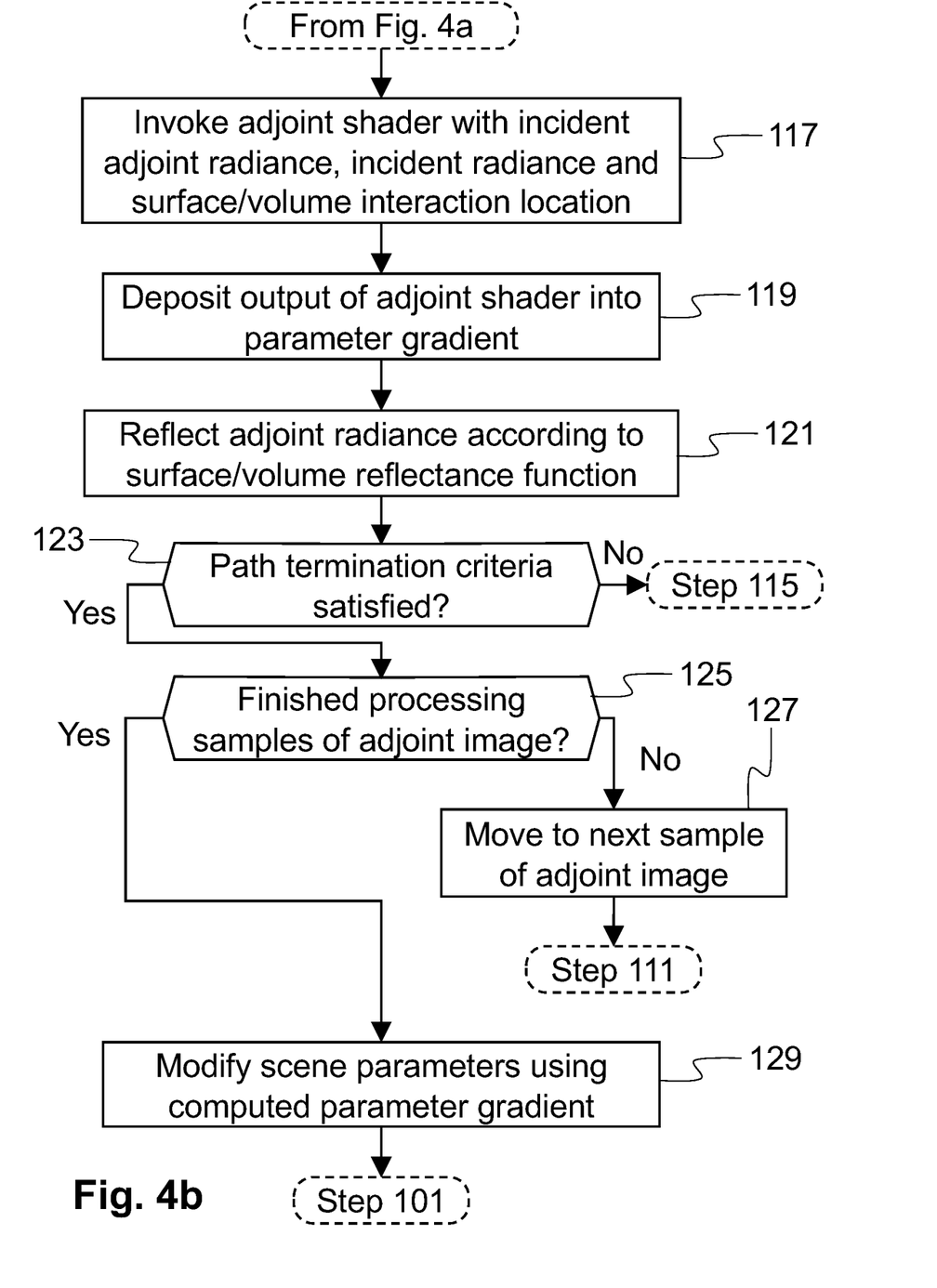

Loop over samples, step 127 in FIG. 4b.
  for i=1 . . . num_samples:
    # Importance sample a ray from the sensor, step 111 in FIG. 4a.

p,ω,weight=sensor.sample_ray( )

Evaluate the adjoint radiance, step 111 in FIG. 4a.

weight*=$A_e$(δ_y,p,ω)/num_samples

Propagate adjoint radiance into the scene.

δ_x+=radiative_backprop_sample(x,p,ω,weight)

Finished, return gradients.
  return δ_x

Listing 1. Radiative backpropagation takes scene parameters x and an adjoint rendering δ_y as input. It samples a large set of camera rays and propagates the associated adjoint radiance $A_e$ (depending on δ_y) into the scene.

define radiative_backprop_sample(x, p, ω, weight):
  # Find an intersection location with the scene geometry, step 115 in FIG. 4a.

p'=r(p,ω)

Backpropagate to parameters of emitter, if any, steps 117 and 119 in FIG. 4a and FIG. 4b, respectively.

δ_x=adjoint([[$L_e$(p',−ω)]],weight)

Sample a ray from BSDF, step 121 in FIG. 4b.

ω',bsdf_value,bsdf_pdf=sample $f_s$(p',−ω,·)

Backpropagate to parameters of BSDF, if any, steps 117 and 119 in FIG. 4a and FIG. 4b, respectively.

δ_x+=adjoint([[$f_s$(p',−ω,ω')]],weight*$L_i$(p,ω')/bsdf_pdf)

Recurse, step 123 in FIG. 4b.

return δ_x+radiative_backprop_sample(x,p'ω', weight*bsdf_value/bsdf_bdf)

Listing 2. Simplified pseudocode of the propagation operation for surfaces. The two adjoint( ) operations correspond to the two terms of the effective differential emission Q and propagate adjoint radiance to parameters of the emitters (light sources in the scene) and material models of the scene.

Acceleration Using Biased Gradients

An unbiased algorithm for estimating parametric derivatives using an optical analogue of reverse-mode propagation was introduced above. We now turn to a counter-intuitive aspect of the present method, namely that a naïve formulation with biased gradients could be preferable. The word biased here refers to the property that the expected value of the quantity does not correspond to the true solution any longer. More specifically, biased gradients refer to approximations of the gradients (which on average do not give the right answer). The proposed example approximation replaces the effective emission $Q(p,\omega) = \partial_x L_e(p,\omega) + \int_\Omega \Box L_i(p,\omega') \partial_x f_s(p,\omega,\omega') |\cos \theta| d\omega'$, by a simplified expression $Q_{approx}(p,\omega) := \partial_x L_e(p,\omega) + \int_\Omega \Box \partial_x f_s(p,\omega,\omega') |\cos \theta| d\omega'$, where we have substituted the primal radiance term $L_i$ with the value 1. In this case, gradients of individual material parameters still record the correct sign (namely, whether the parameter should increase or decrease), but their magnitude will generally be incorrect. This change was originally motivated from an efficiency perspective: using $Q_{approx}$, radiative backpropagation no longer requires recursive invocations of the primal integrator, and the quadratic time complexity thus becomes linear. However, in our experiments, it was found that biased gradients are not only faster to compute, but that they often lead to improved convergence per iteration even when accounting for their different overall scale. The discussed approximation removes a significant source of variance in the radiative backpropagation procedure (namely, stochastic estimation of $L_i$), which we believe to be responsible for this improvement.

The above inverse radiative backpropagation method is next explained with reference to the flow chart of FIGS. 4a and 4b. In step 101, an image is rendered by using the current set of scene parameters characterising or defining the scene model 1, which in this example is a 3D model. In other words, in this step an ordinary rendering process is carried out to obtain a rendered image 3. The rendering step involves one or more shaders, which can be understood as a type of computer program used for shading in 3D scenes (the production of appropriate levels of light, darkness, and colour in a rendered image). A typical shader considers the material properties at the interaction location along with the light sources in the scene to compute a radiance value that is stored in the rendered image. We will henceforth refer to the shaders used during step 101 as "primal shaders".

The proposed method also involves a new component named "adjoint shader" in subsequent steps. In particular, each primal shader used during the ordinary rendering process in step 101 is associated with a corresponding adjoint shader that implements a mathematical derivative of the primal counterpart. Whereas a primal shader takes scene parameters as input and computes a radiance value, an adjoint shader takes a derivative with respect to radiance as input and computes a derivative with respect to the corresponding scene parameters. Because shaders are typically small and short-running programs, conversion of a primal shader into adjoint shader is straightforward and can be performed by hand, or using a standard differentiation tools based on program transformation. The two invocations of the function named adjoint( . . . ) in Listing 2 correspond to usage of the adjoint shader associated with the emitter and BSDF, respectively.

In step 103, the quality of the rendered image 3 is assessed using an objective function, which compares the rendered image to a reference image. We note that objective functions that are not based on comparison against a reference image are also possible, as long as they are defined in terms of mathematically differentiable functions. In step 105, it is determined whether or not the quality of the rendered image 3 satisfies a given condition. An example of such a condition would be when the value of the objective function falls below a certain threshold. If the condition is satisfied, then the process comes to an end. On the other hand, if in step 105 it was determined that the quality of the rendered image 3 insufficient, then the process continues in step 107, where an adjoint image 7 is obtained or computed by differentiating the objective function. In the example, the size of the adjoint image (i.e. the number of image or picture elements, referred to as pixels) matches the rendered image 3 and reference image 5, and there is a direct correspondence between spatial locations in all three images. In step 109, a parameter gradient is initialised. More specifically, the parameter gradient or its values is/are set to zero. It is to be reminded that the scene parameter gradient is to be understood as a set of scene parameter derivatives. In step 111, the adjoint image 7 is sampled at an integer or fractional sample position to determine an adjoint radiance value associated with the current pixel or sample position 9 of the adjoint image. In other words, the adjoint radiance value is fetched, interpolated or determined using another method from the adjoint image 7 for the current pixel 9, sample or sample position. For instance, the adjoint radiance value of the current sample may be obtained by interpolating the neighbouring pixels (i.e. computing a weighted average of their values). It is to be noted that, instead of processing the adjoint image pixel by pixel, it can be processed using random sampling, where the method would randomly choose a position within the adjoint image in each iteration, and then evaluate the associated adjoint radiance value using linear interpolation. In this context, samples, or pixel samples, can be understood to be or have pixel positions or fractional pixel positions and can be generated subject to arbitrary probability distributions. For example, a given sample may lie somewhere between pixels on the underlying pixel grid. The adjoint radiance value may be a positive value indicating that the spatially corresponding position in the scene should be made brighter, a negative value indicating that the spatially corresponding position in the scene should be made darker, or it may be zero, indicating that no change should be made to the spatially corresponding scene position. It is to be noted that the computing device implementing the present simulation does not necessary use pixels for the scene, and for this reason, the scene may be divided into a set of regions or positions, which have a given spatial relationship with the pixel positions of the adjoint image.

In step 113, a camera emits the fetched adjoint radiance value for the current sample 9 to the scene or scene model 1. More specifically, the amount of the emitted adjoint radiance is given by the adjoint radiance value determined in step 111. In this context, by an emission operation is understood a simulation operation, which generates a ray starting at the sensor or camera that will subsequently be used to propagate the adjoint radiance value. In step 115, the next interaction location of the emitted adjoint radiance with a surface or volume of the scene is found. For this purpose, a ray tracing algorithm may be used to determine the interaction location of the emitted radiance with an intersected surface. Alternatively, or in addition, a free path sampling algorithm such as delta tracking may be used when the scene contains volumes (sometimes referred to as "participating media") such as smoke or steam for instance. In step 116, an incident radiance value or an approximation thereof at the interaction location is determined, using techniques that could include standard approaches such as direct illumination and/or BSDF sampling, multiple importance sampling, and estimation of indirect illumination using recursive path tracing. The incident radiance value expresses the amount of incident radiance that travels from the surrounding environment towards the interaction location. In step 117, the adjoint shader associated with the current interaction location is invoked with the interaction location, the incident adjoint radiance and the incident radiance at the interaction location in the scene (i.e. the radiance received at the surface or volume), and it then converts these inputs into a resulting change to scene parameters. In other words, the adjoint shader is an intermediary that converts a given amount of adjoint radiance into the resulting scene parameter gradient that suitably modifies the scene. It is to be noted that this step may be modified so that the incident radiance estimates are replaced with an approximation, which may be a constant, such as the value 1. This greatly improves the runtime performance of the method. While it naturally introduces some errors in the resulting gradient, the underlying trade-off between performance and accuracy often makes this approximation preferable. In step 119, the output of the adjoint shader is deposited into the parameter gradient to obtain an updated parameter gradient. The adjoint shader output is a set of (local) derivatives of the scene parameters that result from incident adjoint radiance at the given scene position. It is to be noted that the parameter gradient or the updated parameter gradient can be understood as a global gradient covering all the derivatives of the entire scene.

In step 121, the incident adjoint radiance is reflected from the scene according to a surface and/or volume reflectance function, which defines how light is reflected at an opaque surface or volumetric region such as smoke or steam. In particular, a reflected ray is sampled corresponding to the material properties, which are encoded in the reflectance function defined at the interaction location, which is optionally specified before the present inverse rendering method is started. In step 123, it is determined whether or not a path termination criterion or criteria is/are satisfied for the currently considered light ray(s). If this is not the case, then the process continues in step 115. If it was determined that the path termination criterion or criteria is/are satisfied, for example if the propagating light has sufficiently attenuated, then the process continues in step 125. In this step, it is determined whether or not all the samples have been processed or considered. If not all the samples have been considered, then in step 127, another sample is now processed or considered. It is to be noted that the newly selected sample may or may not be previously selected or processed. In other words, it is possible to reprocess already processed samples. From step 127, the process continues in step 111. If on the other hand in step 125 it was determined that all the samples have been processed, then the process continues in step 129. In this step, the scene parameters are modified or updated by using the updated parameter gradient. It is to be noted that in the flow chart of FIGS. 4a and 4b, steps 109 to 127 form the radiative backpropagation phase and thus forms the core contribution of the present invention. It is to be noted that the method illustrated in the flow chart of FIGS. 4a and 4b is run once collectively for all the scene parameters. In other words, it is not necessary to run the algorithm separately for each individual scene parameter.

Figure 5:
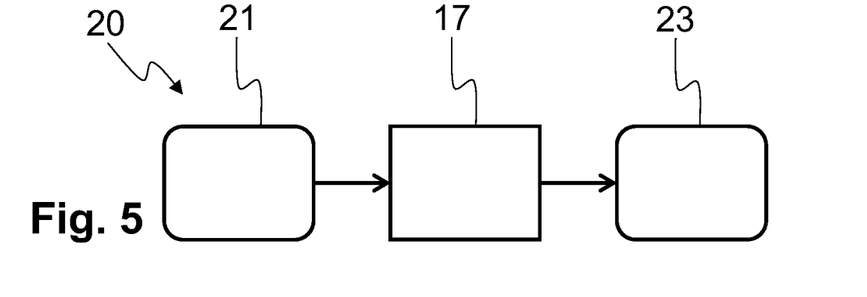
FIG. 5 shows a block diagram of an artificial intelligence system where the teachings of the present invention may be applied.
Figure 6:
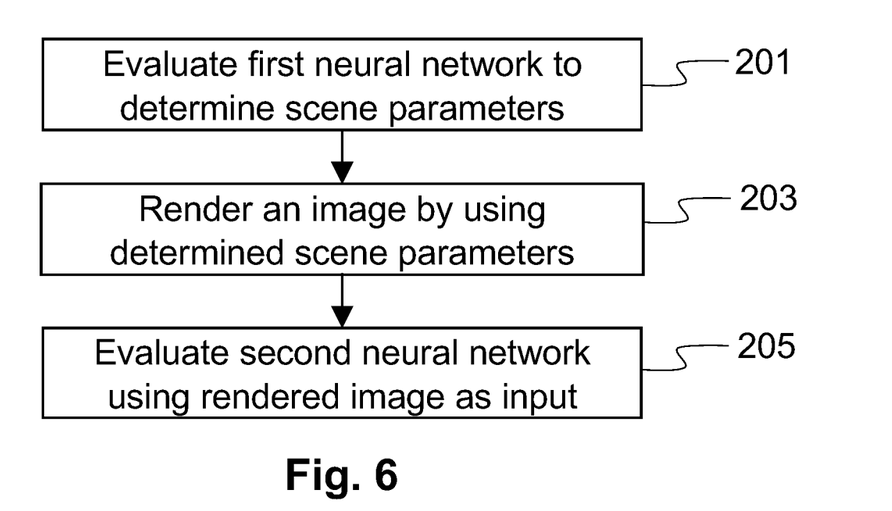
FIG. 6 is a flow chart summarising a forward pass operation in the system of FIG. 5.
Figure 7:
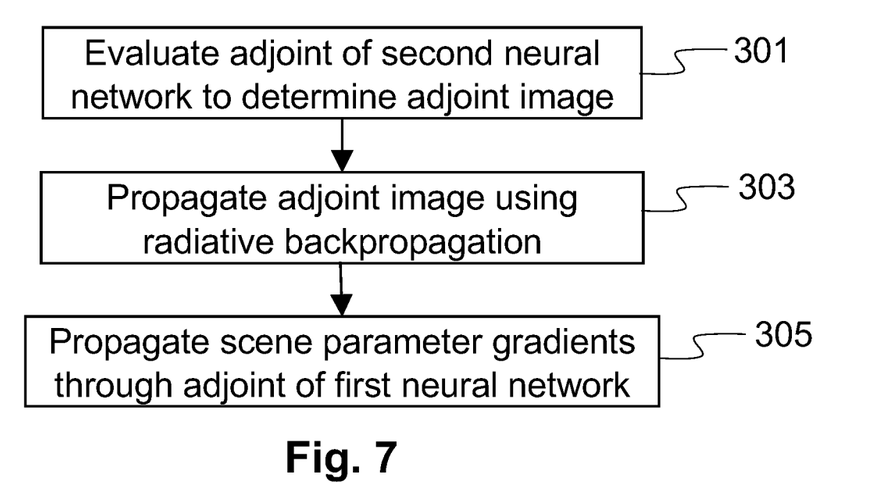
FIG. 7 is a flow chart summarising an adjoint pass operation in the system of FIG. 5.

The proposed radiative backpropagation method enables efficient derivative propagation through a rendering algorithm, and this also makes the approach appealing to other scenarios where such derivatives are required. For example, the method can be embedded into a larger-scale computation and then differentiated end-to-end. As an example of this idea, FIG. 5 shows a simplified network structure when the teachings of the present invention are applied to neural networks. The network 20 in this example comprises a first artificial neural network 23, a second artificial neural network 25, and the rendering algorithm 17 connected to the first and second artificial neural networks 23, 25. In FIG. 5, the rendering algorithm is thus located between the first and second artificial neural networks 23, 25. The flow chart of FIG. 6 briefly summarises how the network 20 is applied during a forward pass, i.e. when the network 20 is operated from left to right, while the flow chart of FIG. 7 briefly summarises how the network 20 is applied during an adjoint pass, i.e. when the network 20 is operated from right to left. Referring to FIG. 6, in step 201, the first neural network is evaluated to determine scene parameters. In step 203, the rendering algorithm 17 renders an image by using the determined scene parameters. In step 205, the second neural network is evaluated by using the rendered image as an input to the second neural network. Referring to the flow chart of FIG. 7, in step 301, an adjoint of the second neural network is evaluated to determine an adjoint image. In step 303, the adjoint image is propagated through the scene by using the radiative backpropagation algorithm of the rendering algorithm 17 to obtain the updated parameter gradient. In step 305, the updated scene parameter gradient is propagated through an adjoint of the first neural network to determine the gradient with respect to its coefficients. In this application scenario, the method is used to train a neural network, so the scene parameter gradients only show up in the rendering algorithm block, and the ultimate goal is to train the neural network.

To summarise the above teachings, the present invention is based on the following observation: whereas normal rendering involves propagating light from a light source through a scene until it reaches a sensor, the process of differentiation can be seen to operate in the reverse direction. At the beginning of an optimisation step, we may find that a certain part of the image should be darker or brighter to improve performance with respect to the objective function. The only way to do so is by propagating this positive or negative change to objects that are directly or indirectly visible in that part of the image. This observation is not just coincidental. It turns out that the derivative of light can be thought of as simply another type of "radiation" that follows the standard physical laws, i.e. it can be reflected or refracted just like ordinary light. The main differences are that ordinary light transfers a positive amount of energy, while the derivative of light can be positive or negative. Furthermore, it is "emitted" by the camera (which can now be thought of as a type of video projector) and it is "received" by objects whose properties we are trying to determine. The main consequence of this observation is that differentiable rendering now becomes possible by performing a simulation of this new type of radiation, which is not unlike solving a normal rendering problem. Importantly, we no longer need to follow the standard approach of performing a simulation and recording a transcript to obtain derivatives.

Due to the challenging nature of inverse rendering, it has not been widely used so far. However, improvements that will result from the present invention will enable applications to several important problems as explained next.

Engineering/Fabrication: Designing products with a desired optical behaviour is a standard problem in the field of optics and engineering in general. Examples include the design of lenses for cameras or mobile phones or liquid-crystal displays (LCD) screens (for instance, to distribute background illumination uniformly across the screen). A good technique for inverse rendering will have a significant impact in this domain because it will inform engineers how they can modify their design to get closer to a design objective. To give an example of a challenging inverse problem: we have experimented with the design of transparent glass surfaces that refract red, green, and blue light that is subsequently received by a screen or wall. Using differentiable rendering, we were able to compute the profile of a glass surface with small height variations that refracts light in such a way as to reproduce a specified colour image.

3D Reconstruction: With the widespread use of computer graphics in our society, high quality scene reconstruction has become increasingly important. For instance, we may want to capture a 3D environment, such as a building, so that it can be transmitted digitally or explored using technologies such as virtual reality. Current methods for 3D reconstruction are limited in the quality they can achieve because they do not account for the indirect effects of light that were previously mentioned. This leads to problematic inconsistencies in the resulting reconstructions that an inverse rendering method based on the physical laws of light would be able to avoid.

Architecture: It is a common problem in architecture that excessive sunlight exposure in the proximity of windows produces bothersome glare, while interior parts of a building are too dark and require supplemental electric lighting. The field of daylighting pursues innovative solutions that make better use of this free natural resource while reducing glare at the same time. Current daylighting practice mostly relies on experience and occasional simulations to test the performance of a tentative design. However, such simulations are of limited use because they can only determine whether or not a building satisfies a design objective (e.g. if a minimum lighting level is achieved throughout the building). In contrast, an inverse rendering algorithm could provide an architect with advice on how the design needs to be changed to reach the design objective.

Medical Imaging: Computed tomography (CT) scanners reveal cross-sectional images of a patient's body by performing a sequence of measurements under X-ray illumination. The resulting data cannot be directly visualised and must first be processed by a computer program to reconstruct a plausible interior structure that could have produced the observed measurements. This is a classic example of an inverse simulation that is already currently in use (known as the Radon transform). However, currently used approaches are not rigorously based on the physics of light: in particular, they assume that X-rays are only absorbed, but they are in fact also scattered. The present invention could be used to perform an inversion that considers both absorption and scattering to improve the fidelity of X-ray CT images.

Microscopy: Modern optical microscopes are powerful modular devices that enable a range of different observations. Unfortunately, most specimens are extremely thin and almost invisible in standard microscopes, hence techniques for optical contrast enhancement have been a focus of considerable research for over 100 years. Examples include differential interference contrast, polarisation, darkfield, and fluorescence microscopy. Nowadays, optical contrast enhancement is almost always combined with digital acquisition using a charge-coupled device (CCD) or complementary metal-oxide semiconductor (CMOS) sensor followed by digital contrast enhancement via optical sectioning and deconvolution to further improve contrast. However, deconvolution is only a crude approximation of the true physical processes that result in a loss of contrast. An inverse rendering method could more closely reproduce these true sources of contrast loss to produce higher-fidelity digital reconstructions.

Earth Climate Modelling: Earth climate research crucially depends on measurements of the atmospheric distribution of $CO_2$, which is mainly obtained using satellites. However, satellites cannot directly measure $CO_2$. They capture photographs at different wavelengths that must be mathematically processed to obtain this information. Current methods for solving this inverse problem are unaware of many aspects of the images including topography, cloud shape, shadowing, etc. The United Nations Intergovernmental Panel on Climate Change (IPCC) has identified the resulting errors as one of the major cause of discrepancies between different climate sensitivity models. The present invention could be used to improve the accuracy of this inverse problem.

Performing light simulations in reverse is an elementary building block, and there are applications in domains beyond the ones mentioned above.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. Further variants may be obtained by combining the teachings of any of the features explained above.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A computer-implemented inverse rendering method comprising:
    computing an adjoint image by differentiating an objective function that evaluates the quality of a rendered image, image elements of the adjoint image encoding the sensitivity of spatially corresponding image elements of the rendered image with respect to the objective function;
    sampling the adjoint image at a respective sample position to determine a respective adjoint radiance value associated with the respective sample position;
    emitting the respective adjoint radiance value into a scene model characterised by scene parameters;
    determining an interaction location of a respective incident adjoint radiance value with a surface and/or volume of the scene model;
    determining a respective incident radiance value or an approximation thereof at the interaction location, the respective incident radiance value expressing the amount of incident radiance that travels from the surrounding environment towards the interaction location; and
    updating a scene parameter gradient by using at least the interaction location and the respective incident adjoint radiance value and the respective incident radiance value or its approximation at the interaction location,
    wherein the scene parameter gradient is updated without generating a transcript of the computation of the adjoint image.

2. The method according to claim 1, wherein the updated scene parameter gradient is computed by invoking an adjoint shader with the interaction location, the respective incident radiance value at the interaction location, and/or the respective incident adjoint radiance value, and by depositing an adjoint shader output onto the scene parameter gradient to obtain the updated scene parameter gradient.

3. The method according to claim 1, wherein the method further comprises initialising the scene parameter gradient prior to updating it.

4. The method according to claim 1, wherein the sample position is an integer or fractional sample position.

5. The method according to claim 1, wherein the respective adjoint radiance value is emitted in a computer simulation.

6. The method according to claim 5, wherein the respective adjoint radiance value is emitted from a camera in the computer simulation.

7. The method according to claim 1, wherein the parameter gradient comprises a set of scene parameter derivates.

8. The method according to claim 1, wherein the method further comprises rendering the scene model using an initial set of scene parameters to obtain the rendered image.

9. The method according to claim 1, wherein the method further comprises determining whether or not the rendered image satisfies a given quality target, and computing the adjoint image in the case where the quality target is not satisfied.

10. The method according to claim 1, wherein the interaction location of the respective adjoint radiance value is determined by using a ray tracing algorithm to determine an intersection location of a surface of the scene model with an adjoint radiance ray, and/or the interaction location of the respective adjoint radiance value is determined by using a free-flight sampling algorithm to determine an intersection location of a volume of the scene model with an adjoint radiance ray.

11. The method according to claim 1, wherein the method further comprises simulating reflection of the respective adjoint radiance value from the surface and/or volume at the interaction location to further propagate reflected adjoint radiance recursively to account for inter-reflection between different parts of the scene model.

12. The method according to claim 1, wherein the method further comprises determining whether or not one or more path termination criteria have been met for the emitted respective adjoint radiance value.

13. The method according to claim 1, wherein the respective incident radiance value at the interaction location is an approximation, such as a predefined constant.

14. The method according to claim 1, wherein the respective adjoint radiance value is a positive value when one or more scene parameter values should be modified so that the rendered image should become brighter in a spatial location corresponding to a spatial location of the respective sample position of the adjoint image, and wherein the respective adjoint radiance value is a negative value when one or more scene parameter values should be modified so that the rendered image should become darker in a spatial location corresponding to a spatial location of the respective sample position of the adjoint image, or vice versa.

15. The method according to claim 1, wherein the scene parameters comprise pixelised and/or voxelised representations of the scene model.

16. The method according to claim 1, wherein the scene parameters comprise one or more of the following items: object shape, object position, object material, light source parameter(s), camera pose, and surface parameter(s).

17. The method according to claim 1, wherein the respective adjoint radiance value is determined and emitted individually for a plurality sample positions of the adjoint image, and updating the scene parameter gradient by using the interaction locations of a plurality of incident adjoint radiance values.

18. The method according to claim 1, wherein the rendered image and the adjoint image have the same size, and wherein a respective image element of the rendered image has a spatially corresponding sample in the adjoint image.

19. The method according to claim 1, wherein the method further comprises evaluating the quality of a rendered image by using an objective function.

20. The method according to claim 19, wherein the quality of the rendered image is evaluated by comparing the rendered image to a reference image by using the objective function.

21. The method according to claim 1, wherein the method further comprises modifying at least some of the scene parameters by using the updated scene parameter gradient.

22. A non-transitory computer program product comprising instructions for implementing the steps of the method according to claim 1 when loaded and run on computing means of a computing apparatus.

23. An apparatus for carrying out an inverse rendering of an image, the apparatus being configured to perform operations comprising:
   compute an adjoint image by differentiating an objective function that evaluates the quality of a rendered image, image elements of the adjoint image encoding the sensitivity of spatially corresponding image elements of the rendered image with respect to the objective function;
   sample the adjoint image at a respective sample position to determine a respective adjoint radiance value associated with the respective sample position;
   emit the respective adjoint radiance value into a scene model characterised by scene parameters;
   determine an interaction location of a respective incident adjoint radiance value with a surface and/or volume of the scene model;
   determine a respective incident radiance value or an approximation thereof at the interaction location, the respective incident radiance value expressing the amount of incident radiance that travels from the surrounding environment towards the interaction location; and
   update a scene parameter gradient without generating a transcript of the computation of the adjoint image by using at least the interaction location and the respective incident adjoint radiance value and the respective incident radiance value or its approximation at the interaction location.

* * * * *